United States Patent
Kumawat et al.

(10) Patent No.: US 10,580,019 B2
(45) Date of Patent: Mar. 3, 2020

(54) METHODS AND DEVICES FOR OBTAINING INFORMATION ABOUT CONSUMER SPENDING

(71) Applicant: MASTERCARD INTERNATIONAL INCORPORATED, Purchase, NY (US)

(72) Inventors: Jaipal Singh Kumawat, Sikar (IN); Vipul Mehrotra, New Delhi (IN); Gurpreet Atwal, Somers, NY (US)

(73) Assignee: Mastercard International Incorporated, Purchase, NY (US)

( * ) Notice: Subject to any disclaimer, the term of this patent is extended or adjusted under 35 U.S.C. 154(b) by 239 days.

(21) Appl. No.: 15/453,761

(22) Filed: Mar. 8, 2017

(65) Prior Publication Data

US 2017/0262871 A1 Sep. 14, 2017

(30) Foreign Application Priority Data

Mar. 9, 2016 (SG) .............................. 10201601831S (51) Int. Cl.
*G06Q 30/02* (2012.01)
*G06Q 10/08* (2012.01)

(52) U.S. Cl.
CPC ....... *G06Q 30/0201* (2013.01); *G06Q 10/087* (2013.01)

(58) Field of Classification Search
CPC ......... G06Q 10/00; G06Q 40/06; G06F 17/60
USPC ....................................................... 705/7.29
See application file for complete search history.

(56) References Cited

U.S. PATENT DOCUMENTS

| | | | |
|---|---|---|---|
| 5,974,396 A | 10/1999 | Anderson et al. | |
| 7,194,422 B1 | 3/2007 | St. John Killick | |
| 8,117,072 B2* | 2/2012 | Kim .................. | G06Q 30/02 705/26.62 |
| 8,606,649 B2* | 12/2013 | Keener, Jr. .......... | G06Q 30/0282 705/26.1 |
| 8,818,854 B2* | 8/2014 | Bennett .............. | G06Q 30/0207 705/14.39 |
| 2001/0042022 A1* | 11/2001 | Kirkpatrick .......... | G06Q 30/012 705/302 |
| 2006/0242011 A1* | 10/2006 | Bell .................. | G06Q 30/02 705/14.25 |
| 2011/0029362 A1* | 2/2011 | Roeding .............. | G06Q 30/00 705/14.13 |
| 2011/0040609 A1* | 2/2011 | Hawkins .............. | G06Q 30/02 705/14.25 |
| 2012/0259690 A1* | 10/2012 | Bennett .............. | G06Q 30/0207 705/14.23 |
| 2012/0316954 A1* | 12/2012 | Bennett .............. | G06Q 30/0207 705/14.39 |
| 2012/0323663 A1 | 12/2012 | Leach | |

(Continued)

*Primary Examiner* — Romain Jeanty
(74) *Attorney, Agent, or Firm* — Armstrong Teasdale LLP (57) ABSTRACT

When a consumer makes a purchase at a retail location, a communication device associated with the consumer receives information specifying the type of product purchased. This may be done by the consumer entering the information manually, by the communication device receiving a data file over an interface, or by a camera of the communication device capturing a picture of a receipt. The information may be, or may be converted into, stock-keeping unit (SKU) data. The data can be analyzed to derive consumer spending patterns and to suggest product offers to the consumer.

32 Claims, 5 Drawing Sheets

(56) References Cited

U.S. PATENT DOCUMENTS

| | | | |
|---|---|---|---|
| 2013/0013430 A1* | 1/2013 | Roberts | G06Q 20/202 |
| | | | 705/16 |
| 2013/0173407 A1* | 7/2013 | Killian | G06Q 20/0855 |
| | | | 705/21 |
| 2014/0019231 A1 | 1/2014 | Sinclair | |
| 2014/0201088 A1 | 7/2014 | Pothuri | |
| 2015/0032586 A1 | 1/2015 | Blackhurst et al. | |
| 2015/0193791 A1 | 7/2015 | Gao et al. | |
| 2016/0189164 A1* | 6/2016 | Tolksdorf | G06Q 30/016 |
| | | | 705/304 |

* cited by examiner

METHODS AND DEVICES FOR OBTAINING INFORMATION ABOUT CONSUMER SPENDING

CROSS REFERENCE TO RELATED APPLICATIONS

This application claims the benefit of Singapore Patent Application No. 10201601831S filed Mar. 9, 2016, which is hereby incorporated by reference in its entirety.

BACKGROUND

The present disclosure relates to methods, devices and software for collecting information about consumer spending.

Various methods are used for tracking a consumer's online spending habits, for example by collecting detailed information about which products the consumer purchases online. It is also common to collect information about products which the consumer views online but does not purchase. Note that the term "product" includes any of physical objects, data products (such as music or software) or services. Online merchants can collect this information as their consumers interact with them. Internet service providers who supply the consumers with their internet access can collect this information as the consumers interact with a plurality of merchants.

By contrast, it is much harder to track the spending of a consumer who purchases products at one or more retail locations. For example, merchants may find it hard to recognize that a certain consumer makes repeated purchases. Furthermore, merchants have a natural disincentive to share any information they manage to collect about their consumers with other merchants, since this information is a valuable resource to help merchants compete with each other (e.g. to assist merchants to perform targeting marketing to attract consumers who are currently using other merchants).

Sometimes a consumer's behavior may be tracked from records of payment transactions made using a payment card, but this is harder in the case of consumers who use multiple cards, especially if the payment cards are associated with different payment networks. Tracking consumers who make payments using cash is particularly difficult.

BRIEF DESCRIPTION

The present disclosure aims to provide new and useful methods, systems and software products for collecting information about the spending of a consumer who purchases one or more products at a retail location.

In general terms, the disclosure proposes that a communication device associated with a consumer includes a software application ("app") which receives information characterizing a purchase made by the consumer in a retail location. The information includes details of the product(s) purchased.

A given merchant generally sells a certain set of types of product, and the information indicates a specific one of those types of product.

Alternatively or additionally, the information indicates that the product is one of a set of product types. For example, if the merchant sells a certain product in various colors, the information may not specify the color, but may otherwise exactly identify the product.

The information specifies exactly the type of the product according to an inventory management system. That is, it is sufficient to identify all the attributes of the product (such as manufacturer, description, material, size, color, packaging, and warranty terms) which distinguish it from other product types in the inventory management system. The information may either be in the form of a code number according to the pre-defined product inventory system, or may be data from which the code number can be determined.

In one embodiment, the information may be a stock keeping unit (SKU) code. An SKU is a unique identifier code which specifies exactly the product type according to a pre-defined product inventory system. Alternatively, it may be information from which the SKU may be deduced. Note that currently SKU codes are not regulated nor standardized. However, the information may alternatively be of a form which is standardized, such as a Universal Product Code (UPC).

In one embodiment, the information may be received in the form of manual data input by the consumer.

Alternatively, the information may be present within an automatically generated data file obtained by the communication device. The data file may be automatically generated by a computer system associated with the merchant and uploaded into the communication device. In this case, the data file may be an electronic version of a receipt or a scanned version of a paper receipt.

Alternatively, the automatically generated data file may be an image captured by a camera of the communication device, such as an image of a receipt issued by the merchants.

The automatically generated data file may be analyzed to extract the information characterizing the product(s) purchased by the consumer. Typically this is done by the software application, although it may alternatively be done by uploading the data file to a remote server for analysis.

The communication device may also transmit at least part of the information out of the communication device. The communication device may upload at least some of the information to a remote server.

The communication device may also store the information in a database which it can later access. Typically, the database is stored in a data storage device within the communication device. However, in principle the database could be in a remote location, which is accessible to the communication device.

The process may be repeated for multiple purchases the consumer makes, e.g. at a variety of different merchant locations. Thus, a database is accumulated of information describing the types of products purchased by the consumer at different times.

Based on the information, the software application, or the remote server, may interrogate a database (such as a database associated with the remote server) to obtain data which is transmitted to the consumer. This may for example be information about offers by merchants to supply one or more of the same products, or related products. The merchants may be ones in a certain geographical area, such as one defined based on a location associated with the consumer, or the location of the retail premises from which the consumer purchased a product.

When information in respect of multiple consumers is transmitted by the server, by instances of the software application on respective communication devices operated by the consumers, the server is typically able to collate the data to derive consumer spending patterns.

The consumer may be rewarded for utilizing the software application. This is particularly the case in embodiments which require the consumer to perform one or more actions in the process for entering the information into the communication device. This action may be one of initiating the communication device (i.e. signaling to it that a purchase has been or will soon be made), manually entering the information, authorizing the uploading to the communication device of an automatically generated data file generated by a computer system of the merchant, or controlling the camera of the communication device to capture the image.

Alternatively or additionally, the consumer may benefit in other ways from the software application. For example, the software application may be configured to retain the automatically generated data files, to provide a record of the receipts. Furthermore, the consumer may be able to control the software application to display to the consumer the collected information, or a summary of it such as information about the most frequent purchases made by the consumer. Furthermore, the consumer may benefit from the messages mentioned above, e.g. if the messages indicate to the consumer alternative merchants which offer more cheaply one of the products the consumer has previously bought (e.g. one of the products the consumer most frequently buys).

The term "automatic" refers to a process which is performed substantially without human involvement, save possibly for initiation of the process.

The term "payment card" refers to any cashless payment device associated with a payment account, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, transponder devices, NFC-enabled devices, and/or computers.

The disclosure may be expressed in terms of the communication device, or the method which the communication device performs, or in terms of the software product itself, such as at a time when it is stored in non-transitory form on a tangible data storage device. The data storage device may be within the communication device, or it may be a database from which the communication device is able to download the software application.

BRIEF DESCRIPTION OF THE DRAWINGS

An embodiment of the disclosure will now be described, by way of example only, with reference to the following drawings, in which.

DETAILED DESCRIPTION

Figure 1:
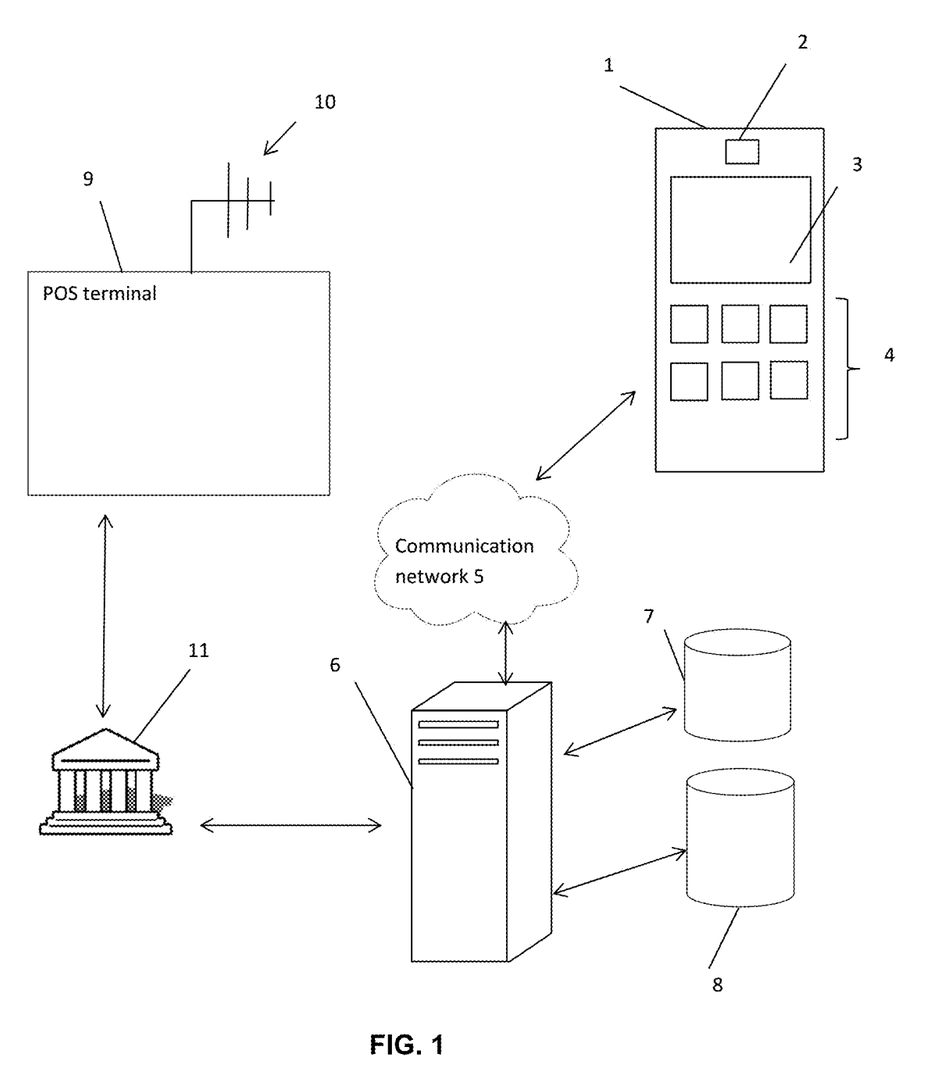
FIG. 1 shows schematically a computerized network which is suitable to perform the method which is an embodiment of the disclosure.
Figure 2:
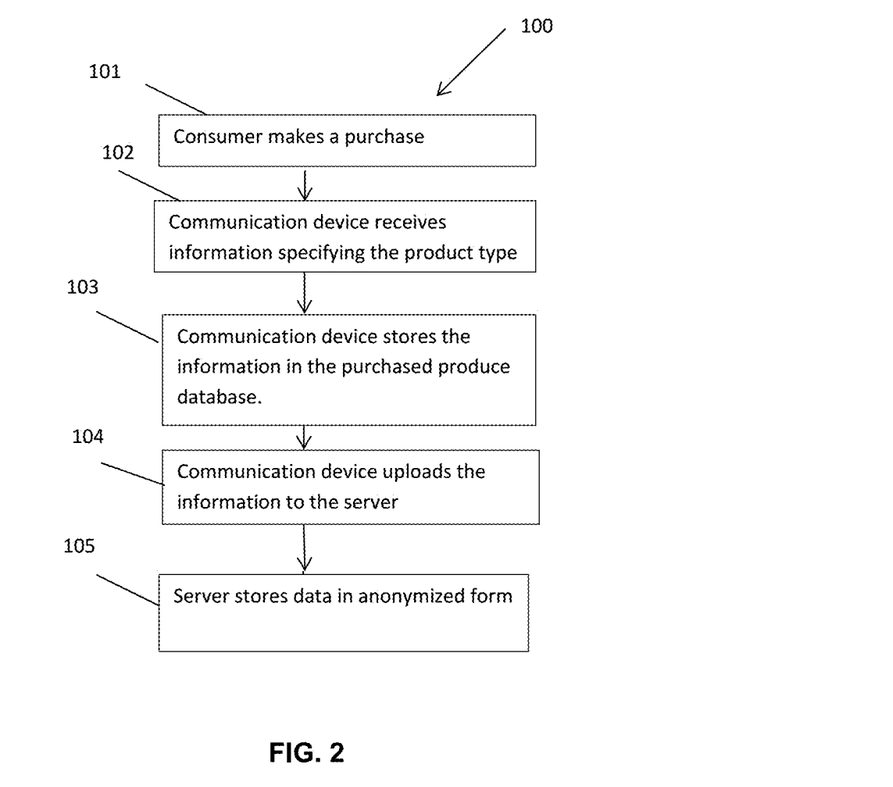
FIG. 2 is a flow diagram of a method which is an embodiment of the disclosure.

Referring firstly to FIG. 1, a computerized network is shown which is suitable for performing a method illustrated in FIG. 2 which is an embodiment of the disclosure. The computerized network includes a communication device 1 associated with a consumer. The communication device 1 may for example be a smart-phone or a tablet computer.

The communication device 1 has a camera 2, a screen 3 and a keyboard 4. The communication device further includes a wireless interface for communication with a communication network 5. The connection with the communication network may for example be over a wi-fi network, or a 3G or 4G telecommunication network.

Using the communication network 5 the communication device 1 is in two-way communication with a purchase analysis server 6. The purchase analysis server 6 has access to two databases: a purchase record database 7 which, during the performance of the method, will be populated within information from the communication device 1, and a product offer database 8 which stores information about offers made by respective merchants to supply products. The products may be identified in the product offer database 8 by respective codes, such as SKU codes.

It is envisaged in the future that many merchants will provide automatically accessible information about all the products they offer based on SKU codes and including the prices of the products. A merchant may for example provide this via an application program interface (API) on a server operated by the merchant. This data can be used to populate the product offer database 8. Alternatively or additionally, merchants may be prepared to pay money for information about the products they offer, including any current special offers, to be entered in the product offer database 8.

The computerized network of FIG. 1 further includes a point-of-sale (POS) terminal 9 associated with a merchant and located at retail premises. The POS terminal 9 is provided with a printer (not shown) for printing paper receipts, a screen (not shown), and a wireless interface including an antenna 10.

Optionally, the purchase analysis server 6 may be associated with a payment network. Issuer banks typically issue credit cards associated with a payment network. In a payment transaction involving a payment card, the POS terminal 9 contacts a bank server 11 associated with an acquirer bank at which the merchant maintains an account. If the payment card is associated with the same payment network as the purchase analysis server 6, the bank server 11 contacts the purchase analysis server 6 to obtain authorization for a payment from the payment card. This purchase analysis server 6 does obtain the authorization in a conventional manner by contacting a server (not shown) of the issuer bank which issued the payment card. If the issuer bank server authorizes the payment transaction, the purchase analysis server 6 notifies the bank server 11 which in turn informs the POS terminal 9. The payment transaction is then performed.

Turning now to FIG. 2, the steps of a method 100 which is an embodiment of the disclosure are shown. In step 101, the consumer brings the communication device 1 to the retail premises operated by a merchant, and makes a payment transaction to purchase one or more products at the retail premises using the point-of-sale (POS) terminal 9. At this time, the user may enter a command (that is, an initiation signal) into the communication device 1 to initiate the application running on the communication device. Alternatively, the application may be initiated by an initiation signal transmitted by the point-of-sale terminal.

If the payment for the purchase is made using a payment card the (POS) terminal contacts the bank server 11. If the payment card is associated with the payment network which is associated with the purchase analysis server 6, involves the bank server 11 contacts the purchase analysis server 6 in the conventional process explained above. The server obtains authorization from an issuer bank server (not shown), and send it to the bank server 11 for relay to the POS terminal 9.

In step 102, information identifying the type of each product purchased is entered into the application of the communication device 1. This information is detailed enough to indicate exactly the type of each product according to a pre-defined inventory system, such as an inventory system operated by the merchant. For example, for a given product, the information may be a SKU code of that product in a certain inventory system. Alternatively, the information may be a description of the product sufficient to identify the type of each product (e.g. in the case of a product which is a pair of shoes, the information may be: black shoes, size 6, in the design "brogue", manufactured by a certain shoe manufacturer).

In one embodiment, the consumer keys in the information using the keyboard 4 (or the screen 3 if it is touch sensitive). For example, if the POS terminal displays information on the screen, or prints it on a receipt for the purchase, the consumer may read the information and type it into the communication device 1 using the keyboard 4.

In another embodiment, the POS terminal 9 generates a data file containing the information and transmits it to the consumer device 1 using the antenna 10. The consumer device 1 extracts the information from the data file. For example, the data file may be an electronic receipt for the purchase. Alternatively, it may be an image file produced from a paper receipt (e.g. by scanning).

Figure 3:
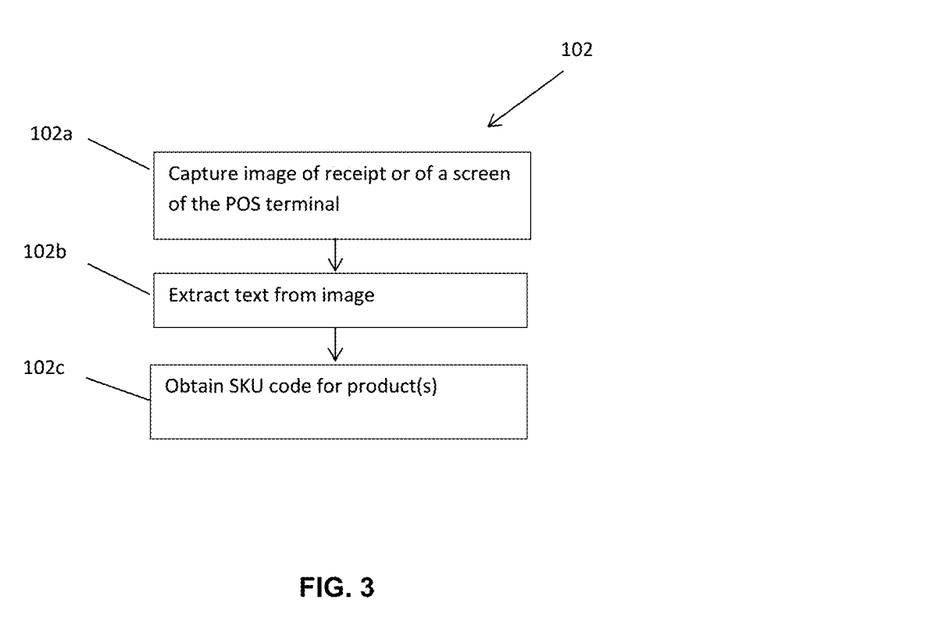
FIG. 3 shows the sub-steps in a possible realization of a step of FIG. 2.

Another embodiment for performing step 102 is illustrated in FIG. 3. In sub-step 102a, the consumer uses the camera 2 to capture an image of the receipt, or the screen of the POS terminal. In sub-step 102b, the application on the communication device 1 extracts text from the image. Several techniques are known for extracting text from an image, such as the TextGrabber utility currency offered by the ABBYY Group. In step 102c, the application obtains the information from the text, such as by identifying the portion of the extracted text which is describing each purchased product.

In all these possible realizations of step 102, if the information received by the communication device 1 is not in the form of an SKU code of a desired inventory system, step 102 may include the application accessing a database (typically one stored in a remote location) using the information to obtain an SKU code for each of the purchased product(s) from the database.

Optionally, the information received in step 102 may include further information about the purchase, such as any one or more of the location of the retail premises, the identity of the merchant, and the time of the purchase.

In step 103, the application stores the information identifying the type of each purchased product in a purchased product database associated with the communication device 1. Typically, this is within the communication device 1, although in principle it could be in a remote location which the communication device 1 can communicate with using the communication network 5.

In step 104, the communication device 1 uploads at least part of the information to the purchase analysis server 6 using the communication network 5.

In step 105, the purchase analysis server 6 enters the information into the purchase record database 7. This may be in an anonymized form, i.e. the data stored in the purchase record database 7 does not uniquely identify the consumer, although it may specify a consumer category to which the consumer belongs, such as consumers of a certain age range, geographical location, economic group, etc.

Optionally, the purchase analysis server 6 includes a consumer database (not shown) which stores information specifying the consumer category of the consumer associated with the communication device. For example, the consumer database may contain an item which associates a communication address (e.g. IP address or phone number) of the communication device with a consumer category of the corresponding consumer. Upon receiving a message from the communication device 1 containing the information, the server may access the consumer database to obtain the corresponding consumer category, and use that information to populate a corresponding section of the database 17 with the information.

In another form of step 105, the information received from the communication device 1 may be stored in a form which is not anonymized. The purchase analysis server 6 may identify the consumer from the communication address of the communication device, and retain the information in a section of the purchase record database 7 relating to that consumer.

If, as mentioned above, the payment was made by a payment card associated with a payment network with which the purchase analysis server 6 is associated, then the purchase analysis server 6 may associate data about the payment transaction which it receives from the acquirer bank server 11 with the information about the purchased product(s) received from the communication device 1. Thus, the purchase analysis server 6 is able to associate SKU data with the payment transactions. The collated information would show the purchase analysis server 6 how the consumer paid for the product(s). Note that this information may not be deducible just from the information received from the communication device 1.

Note that if the purchase analysis server 6 is able to associate a specific payment transaction with the information received from the communication device 1, then this provides another method to identify the consumer (i.e. via the payment card details), so that the purchase analysis server 6 is able to determine which of the sections of the purchase record database 7 the information about the product(s) should be stored in.

If, as mentioned above, the information received in step 102 includes further information about the purchase, such as any one or more of the location of the retail premises, the identity of the merchant, or the time of the purchase, then this further information can be used to help the purchase analysis server 6 associate the payment transaction data received from the bank server 11 with the information received from the communication device.

Although not shown in FIG. 1, the purchase analysis server 6 is also in communication with respective communication devices associated with other consumers, and, in the same way as for the communication device 1, the purchase analysis server 6 receives information in respect of those consumers, and stores it in the purchase record database 7. The consumer database (if any) may store information about the other consumers too, so that the purchase analysis server 6 can determine which consumer category the corresponding consumers belong to.

We now turn to a discussion of the uses which can be made of the data generated in the method 100.

One use would be for the communication device 1 to provide to the consumer (e.g. periodically, or upon a consumer's command) a statement of the consumer's purchases.

This could be done by sending an alert to the consumer on a daily, weekly or monthly basis.

Figure 4:
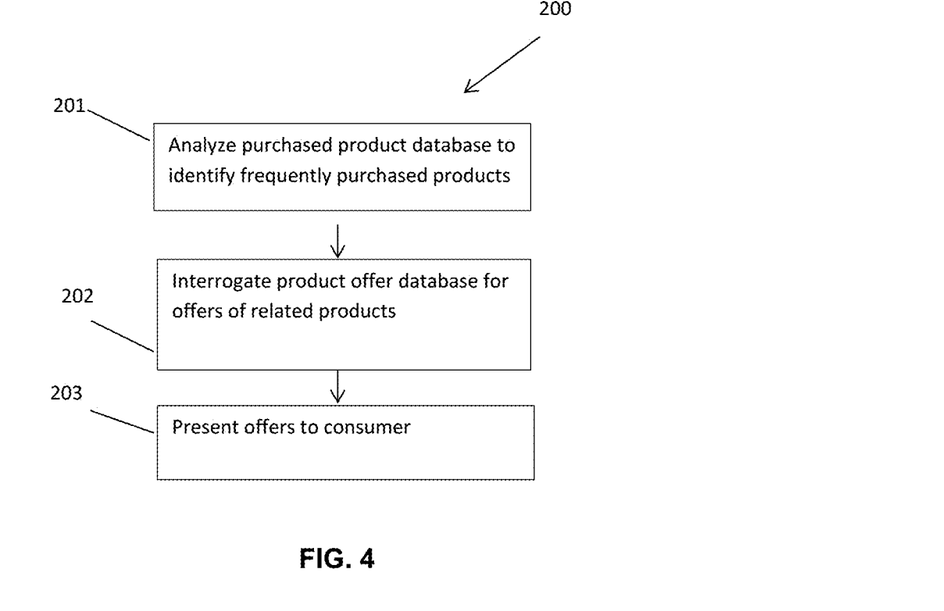
FIG. 4 shows a method of using data generated using the method of FIG. 2.

A second possible use is illustrated in FIG. 4 as the method 200. It may be performed by the application on the communication device 1. Alternatively, it may be performed by the purchase analysis server 6.

In step 201, the purchased product database is analyzed to determine one or more products which the consumer frequently purchases, e.g. the "top" product(s). These may for example be defined as a pre-defined number of products which the consumer buys most frequently during a certain period. Or they may alternatively be defined as the products which the consumer spends most money on during a certain period.

In step 202, the product offer database 8 is analyzed for product offers similar to the "top" products. The offers searched are not limited to the merchant from which the consumer previously bought the "top" product(s). As well as offers in respect of exactly the same product type, the search may include searches for similar products. The search may be limited to offers from merchants with one or more characteristics, such as having retail premises in a geographic area associated with the consumer.

In step 203, information about these offers is presented to the consumer, for example on the screen 3 of the communication device 1.

The data accumulated in the purchase record database 7 can be used in several ways. It could actually constitute a commercial product used to help merchants obtain information about the consumers who are buying their own products, or their competitor's products. It gives information about best-selling products and preferred products. It further makes it possible to analyze seasonal trends, and obtain information which can be useful in designing marketing campaigns.

Furthermore, since, as mentioned above, in some forms of the disclosure the purchase analysis server 6 can identify purchases which are made by using a payment card associated with the same payment network as the purchase analysis server 6, it can also identify those purchases which are not made using such a payment card. Accordingly, the payment network associated with the purchase analysis server 6 can design a marketing campaign directed at the corresponding consumers. This can also be done by another financial institution to which the payment network supplies the data.

Many variations of the scheme above are possible. For example, although in the description above, the information about product offers is provided in the product offer database 8, it may alternatively be collected by the purchase analysis server 6 in real time when step 202 is performed from servers associated with the merchants. The merchants' servers may offer an API for that purpose.

In a further variation, the application in the communication device may give the consumer the additional option to perform the method 200 in real time. In this variation, the application is able to receive information about a product (e.g. by manual entry by the consumer of details of the product, or by scanning an image collected by the camera 2 of, for example, a barcode associated with the product) which the consumer is only considering purchasing. The method 200 is performed to give the consumer information about alternative offers of the product, so that the consumer can make an informed decision about whether to complete the purchase at the retail premises where he/she is presently located.

The application in the computer may be provided with additional functionality which integrates it with other applications. These may be applications associated with merchants. Alternatively or additionally, they may be applications associated with social media, such as What's Up, We Chat or Facebook.

Figure 5:
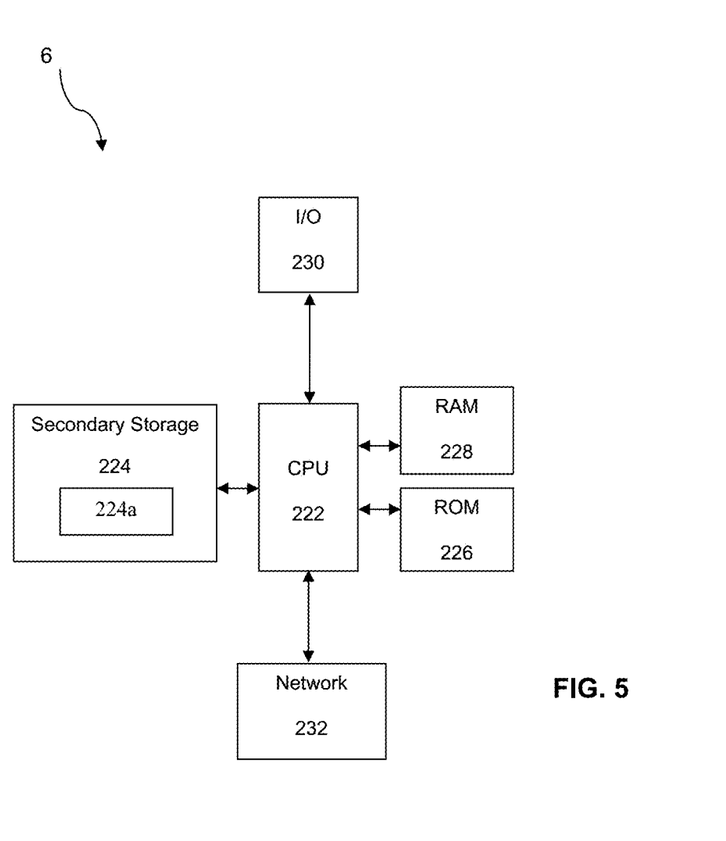
FIG. 5 shows the technical architecture of a server of the computerized network of FIG. 1.

FIG. 5 is a block diagram showing a technical architecture of the purchase analysis server 6.

The technical architecture includes a processor 222 (which may be referred to as a central processor unit or CPU) that is in communication with memory devices including secondary storage 224 (such as disk drives), read only memory (ROM) 226, and random access memory (RAM) 228. The processor 222 may be implemented as one or more CPU chips. The technical architecture may further include input/output (I/O) devices 230, and network connectivity devices 232.

The secondary storage 224 may include one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution.

In this embodiment, the secondary storage 224 has a processing component 224a including non-transitory instructions operative by the processor 222 to perform various operations of the method of the present disclosure. The ROM 226 is used to store instructions and perhaps data which are read during program execution. The secondary storage 224, the RAM 228, and/or the ROM 226 may be referred to in some contexts as computer readable storage media and/or non-transitory computer readable media.

I/O devices 230 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the above-described method operations. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 220 to provide the functionality of a number of servers that is not directly bound to the number of computers in the technical architecture 220. In an embodiment, the functionality disclosed above may be provided by executing the application and/or applications in a cloud computing environment. Cloud computing may include providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 222, the RAM 228, and the ROM 226 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Figure 6:
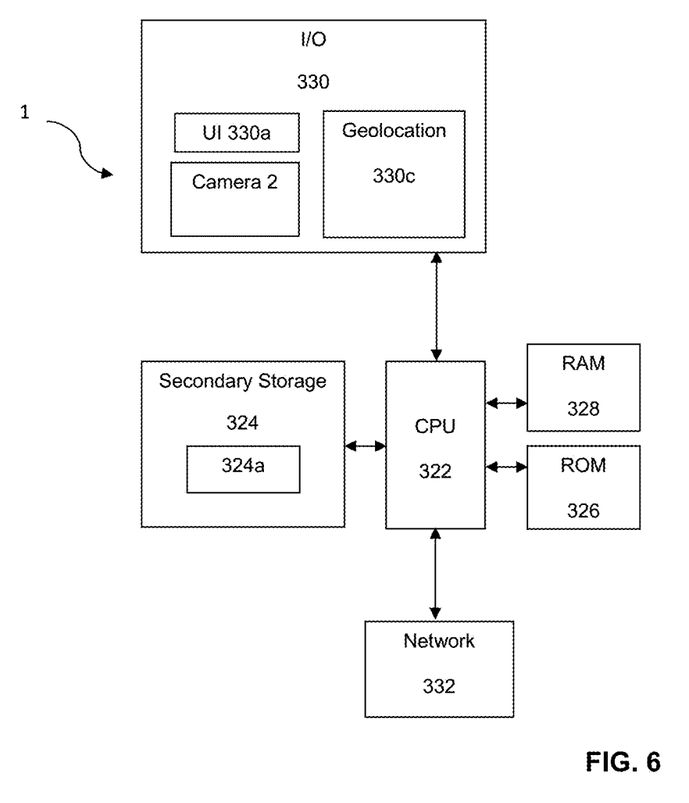
FIG. 6 shows the technical architecture of a communication device of the computerized network of FIG. 1.

FIG. 6 is a block diagram showing a technical architecture of the communication device 1. The technical architecture includes a processor 322 (which may be referred to as a central processor unit or CPU) that is in communication with memory devices including secondary storage 324 (such as disk drives or memory cards), read only memory (ROM) 326, and random access memory (RAM) 328. The processor 322 may be implemented as one or more CPU chips. The technical architecture further includes input/output (I/O) devices 330, and network connectivity devices 332.

The I/O devices include a consumer interface (UI) 330a, the camera 2 and a geolocation module 330c. The UI 330a may include the screen 3 in the form of a touch screen, the keyboard 4, a keypad or other known input device. The camera 2 allows a consumer to capture images and save the captured images in electronic form. The geolocation module 330c is operable to determine the geolocation of the communication device using signals from, for example global positioning system (GPS) satellites.

The secondary storage 324 may include a memory card or other storage device and is used for non-volatile storage of data and as an over-flow data storage device if RAM 328 is not large enough to hold all working data. Secondary storage 324 may be used to store programs which are loaded into RAM 328 when such programs are selected for execution.

In this embodiment, the secondary storage 324 has a processing component 324a, including non-transitory instructions operative by the processor 322 to perform various operations of the method of the present disclosure. The ROM 326 is used to store instructions and perhaps data which are read during program execution. The secondary storage 324, the RAM 328, and/or the ROM 326 may be referred to in some contexts as computer readable storage media and/or non-transitory computer readable media.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 332 may enable the processor 322 to communicate with the Internet or one or more intranets. With such a network connection, it is contemplated that the processor 322 might receive information from the network, or might output information to the network in the course of performing the above-described method operations. Such information, which is often represented as a sequence of instructions to be executed using processor 322, may be received from and outputted to the network, for example, in the form of a computer data signal embodied in a carrier wave.

The processor 322 executes instructions, codes, computer programs, scripts which it accesses from hard disk, floppy disk, optical disk (these various disk based systems may all be considered secondary storage 324), flash drive, ROM 326, RAM 328, or the network connectivity devices 332. While only one processor 322 is shown, multiple processors may be present. Thus, while instructions may be discussed as executed by a processor, the instructions may be executed simultaneously, serially, or otherwise executed by one or multiple processors.

Whilst the foregoing description has described exemplary embodiments, it will be understood by those skilled in the art that many variations of the embodiment can be made within the scope and spirit of the present disclosure.

What is claimed is:

1. A computer-implemented method of generating information characterizing purchases of a consumer upon the consumer purchasing at least one product from a merchant at retail premises associated with the merchant, the method comprising:

establishing a wireless communication channel between a communication device associated with the consumer and a point-of-sale (POS) terminal at the retail premises of the merchant, the wireless communication channel including a wireless interface of the POS terminal, the wireless communication channel established at a time when the communication device is proximate to the POS terminal;

receiving, via the wireless communication channel by the communication device from the POS terminal, information indicating a type of the at least one product purchased via the POS terminal;

accessing, by the communication device, an inventory database using the information, the inventory database in communication with a computer server;

deriving, using the information, from the inventory database a stock keeping unit (SKU) code for the at least one product purchased;

storing the information, including the derived SKU code, in a database in communication with the communication device; and transmitting the information from the communication device.

2. A computer-implemented method according to claim 1, wherein the information is a code corresponding to the type of the at least one product according to a pre-defined product inventory system.

3. A computer-implemented method according to claim 1, further comprising using the information, together with a database describing a pre-defined product inventory system, to derive a code corresponding to the at least one product according to the product inventory system.

4. A computer-implemented method according to claim 1, wherein receiving the information further comprises recognizing data input by the consumer using one or more data input devices of the communication device.

5. A computer-implemented method according to claim 1, wherein receiving the information further comprises receiving a data file generated by computer equipment associated with the merchant, the data file including the information.

6. A computer-implemented method according to claim 1, wherein receiving the information further comprises capturing an image by a camera of the communication device, and analyzing the image to extract the information from the image.

7. A computer-implemented method according to claim 1, wherein transmitting the information further comprises uploading, by the communication device, at least some of the information to a remote server.

8. A computer-implemented method according to claim 7 further comprising collating, by the remote server, the at least some of the information with other data describing products purchased by other consumers, thereby obtaining data describing consumer spending patterns.

9. A computer-implemented method according to claim 1, further comprising using the information to interrogate a database of merchant offers to obtain data, and displaying the data to the consumer.

10. A computer-implemented method according to claim 9 in which the data describes offers by other merchants to supply the at least one product.

11. A computer program product comprising computer program instructions, the computer program instructions being operative, when implemented by a processor of a communication device associated with a consumer and upon the consumer purchasing at least one product from a merchant at retail premises associated with the merchant, to cause the processor to:

establish a wireless communication channel between the communication device associated with the consumer and a point-of-sale (POS) terminal at the retail premises of the merchant, the wireless communication channel including a wireless interface of the POS terminal, the wireless communication channel established at a time when the communication device is proximate to the POS terminal;

receive, via the wireless communication channel from the POS terminal, information indicating a type of the at least one product purchased via the POS terminal;

access an inventory database using the information, the inventory database in communication with a computer server;

derive, using the information, from the inventory database a stock keeping unit (SKU) code for the at least one product purchased;

store the information, including the derived SKU code, in a database in communication with the communication device; and transmit the information from the communication device.

12. A computer program product according to claim 11, wherein the instructions are operative to cause the processor to use the information to access a database describing a pre-defined product inventory system, to derive a code corresponding to the product according to the product inventory system.

13. A computer program product according to claim 11, wherein the instructions are further operative to cause the processor to receive the information by recognizing data input by the consumer using one or more data input devices of the communication device.

14. A computer program product according to claim 11, wherein the instructions are further operative to cause the processor to receive a data file comprising the information though an interface of the communication device, and extracting the information from the data file.

15. A computer program product according to claim 11, wherein the instructions are further operative to cause the processor to analyze an image captured by a camera of the communication device to extract the information from the image.

16. A computer program product according to claim 11, wherein the instructions are further operative to cause the processor to upload at least some of the information to a remote server.

17. A computer program product according to claim 11, wherein the instructions are further operative to cause the processor to use the information to interrogate a database of merchant offers to obtain data, and display the data to the consumer.

18. A communication device for use by a consumer, the communication device comprising a processor and a data storage device storing program instructions, the program instructions being operative, upon the consumer purchasing at least one product from a merchant at retail premises associated with the merchant, to cause the processor to:

establish a wireless communication channel between the communication device associated with the consumer and a point-of-sale (POS) terminal at the retail premises of the merchant, the wireless communication channel including a wireless interface of the POS terminal, the wireless communication channel established at a time when the communication device is proximate to the POS terminal;

receive, via the wireless communication channel from the POS terminal, information indicating a type of the at least one product purchased via the POS terminal;

access an inventory database using the information, the inventory database in communication with a computer server;

derive, using the information, from the inventory database a stock keeping unit (SKU) code for the at least one product purchased;

store the information, including the derived SKU code, in a database in communication with the communication device; and transmit the information from the communication device.

19. A communication device according to claim 18 in which the instructions are further operative to cause the processor to use the information to access a database describing a pre-defined product inventory system to derive a code corresponding to the product according to the product inventory system.

20. A communication device according to claim 18, wherein the instructions are further operative to cause the processor to receive the information by recognizing data input by the consumer using one or more data input devices of the communication device.

21. A communication device according to claim 18, wherein the instructions are further operative to cause the processor to receive a data file comprising the information though an interface of the communication device, and extracting the information from the data file.

22. A communication device according to claim 18, wherein the instructions are further operative to cause the processor to analyze an image captured by a camera of the communication device to extract the information from the image.

23. A communication device according to claim 18, wherein the instructions are further operative to cause the processor to use the information to interrogate a database of merchant offers to obtain data, and display the data to the consumer.

24. A communication device according to claim 18, wherein the instructions are further operative to cause the processor to upload at least some of the information to a remote server.

25. A computerized network comprising:
a plurality of communications devices according to claim 18; and
a computer server comprising a server processor, a data storage device storing server processor program instructions, and a purchase record database, wherein the plurality of communication devices are remote from the computer server and are configured to transmit the information to the computer server over a communication network, and wherein the server processor program instructions are operative to cause the server processor to:
receive over the communications network the information transmitted by the plurality of communication devices;
store the received information in the purchase record database; and
collate the stored information, thereby obtaining data describing consumer spending patterns.

26. A computerized network according to claim 25 further comprising a product offer database storing offers by merchants to supply products, wherein the server program instructions are further operative to cause the server processor to interrogate the product offer database to obtain data, and transmit the data to one or more of the communication devices.

27. A computer-implemented method performed by a computer server, for generating information characterizing consumer spending patterns, the method comprising:
for each of a plurality of communication devices associated with corresponding consumers, receiving, at the computer server, over a communications network information from the communication device, wherein the information is transmitted via a wireless communication channel to the communication device from a point-of-sale (POS) terminal at retail premises of a merchant, wherein the wireless communication channel includes a wireless interface of the POS terminal, wherein the wireless communication channel is established between the communication device and the POS terminal at a time when the communication device is proximate to the POS terminal, wherein the information indicates a type of at least one product purchased via the POS terminal, and wherein the information includes a derived stock keeping unit (SKU) code for the at least one product purchased; and
collating the information received from the plurality of communication devices, thereby obtaining data describing consumer spending patterns.

28. A computer-implemented method according to claim 27, wherein the information includes a code corresponding to the type of the at least one product according to a pre-defined product inventory system.

29. A computer-implemented method according to claim 27 further comprising interrogating, by the computer server, a database of merchant offers to obtain data, and transmitting the data to one or more of the plurality of communication devices.

30. A computer server, for generating information characterizing consumer spending patterns, the computer server comprising a server processor, a data storage device storing server processor program instructions, and a purchase record database, the server processor program instructions being operative to cause the server processor to:
for each of a plurality of communication devices associated with corresponding consumers, receive over a communications network information from the communication device, wherein the information is transmitted via a wireless communication channel to the communication device from a point-of-sale (POS) terminal at retail premises of a merchant, wherein the wireless communication channel includes a wireless interface of the POS terminal, wherein the wireless communication channel is established between the communication device and the POS terminal at a time when the communication device is proximate to the POS terminal, wherein the information indicates a type of at least one product purchased via the POS terminal, and wherein the information includes a derived stock keeping unit (SKU) code for the at least one product purchased;
store the information received from the plurality of communication devices in the purchase record database; and
collate the stored information, thereby obtaining data describing the consumer spending patterns.

31. A computer server according to claim 30, wherein the information includes a code corresponding to the type of the at least one product according to a pre-defined product inventory system.

32. A computer server according to claim 30 further comprising a product offer database storing offers by merchants to supply products, wherein the server processor program instructions are further operative to cause the server processor to interrogate the product offer database to obtain data, and transmit the data to one or more of the communication devices.

* * * * *